United States Patent [19]
Howe

[11] 3,815,428
[45] June 11, 1974

[54] GYROCOMPASSES

[75] Inventor: Edwin W. Howe, North Baldwin, N.Y.

[73] Assignee: Gyrosystems, Inc., Farmingdale, N.Y.

[22] Filed: Aug. 10, 1971

[21] Appl. No.: 170,443

[52] U.S. Cl. .................................. 74/5.4, 74/5.6
[51] Int. Cl. ........................................ G01c 19/28
[58] Field of Search............ 74/5 R, 5.34, 5.4, 5.41, 74/5.47, 5.6; 33/300

[56] References Cited
UNITED STATES PATENTS

| | | | |
|---|---|---|---|
| 1,999,897 | 4/1935 | Fieux | 74/5.4 X |
| 2,633,028 | 3/1953 | Fillebrown | 74/5.6 |
| 3,324,731 | 6/1967 | Burmeister et al. | 74/5.6 |
| 3,463,016 | 8/1969 | Erdley et al. | 74/5.4 |
| 3,481,208 | 12/1969 | Thrasher et al. | 74/5 X |
| 3,534,616 | 10/1970 | O'Connor | 74/5.47 X |
| 3,611,814 | 10/1971 | Haack | 74/5 |

*Primary Examiner*—Manuel A. Antonakas
*Attorney, Agent, or Firm*—Arthur S. Haapaniemi

[57] ABSTRACT

A simplified gyrocompass including a primary reference gyroscopic wheel which is supported in a two axis gimbal system, with an inertia wheel which serves as a primary directional stabilization means. Included is two axis torquing means which replaces conventional high response positional control motors. A third stabilizational gimbal which is normally required is eliminated and replaced by a signal modifier sensitive to cross tilt displacement. A simplified displacement sensing and torquing system is also provided for the primary reference gyro.

16 Claims, 10 Drawing Figures

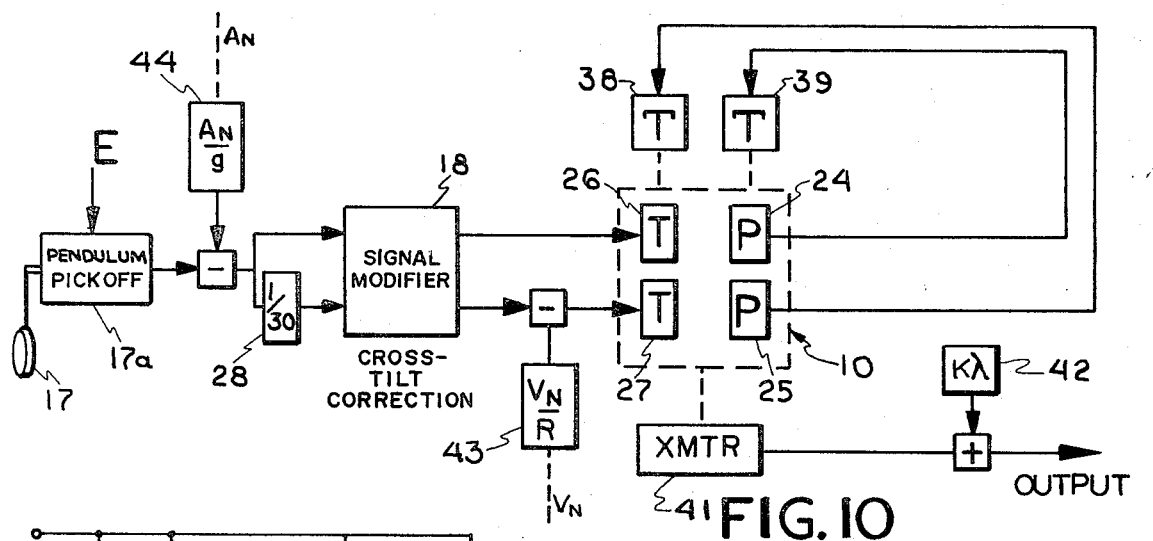
FIG.10
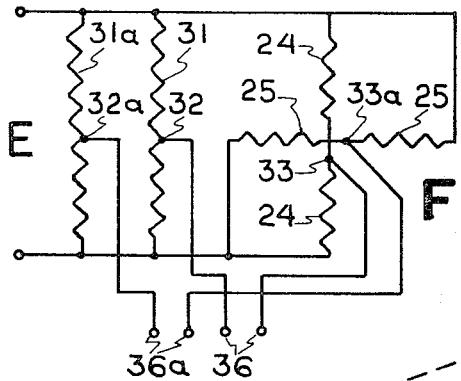
FIG.4
FIG.6
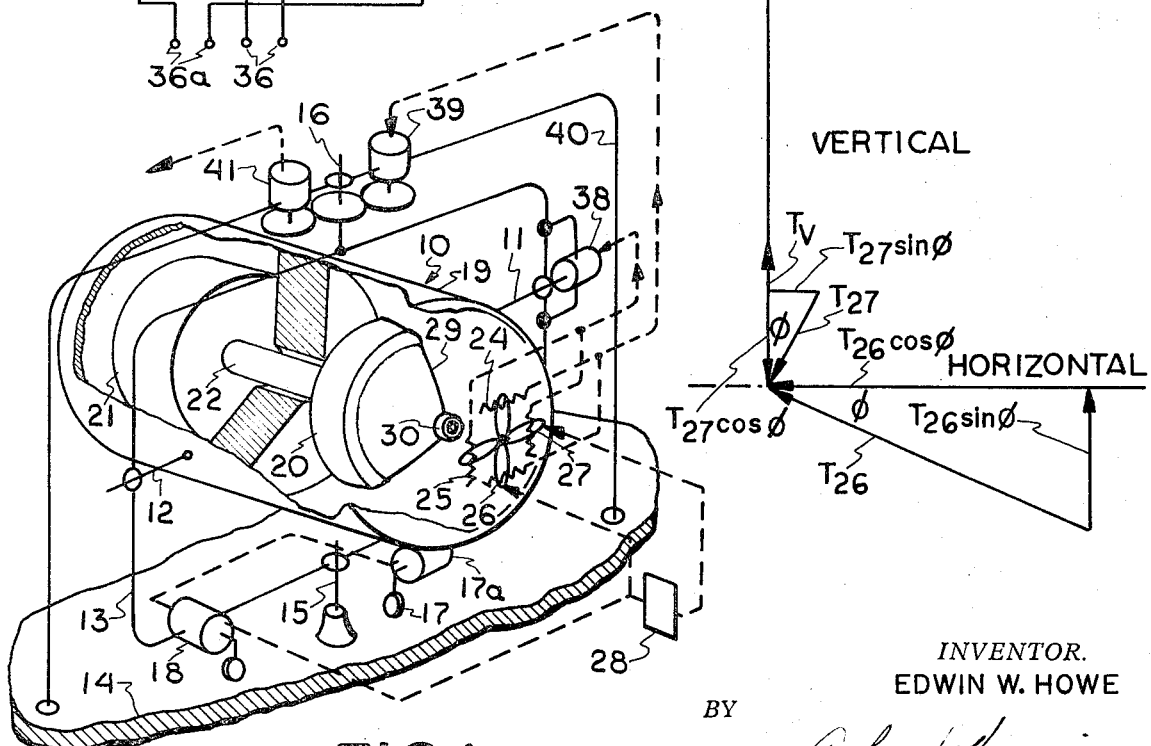
FIG.1
*INVENTOR.*
EDWIN W. HOWE

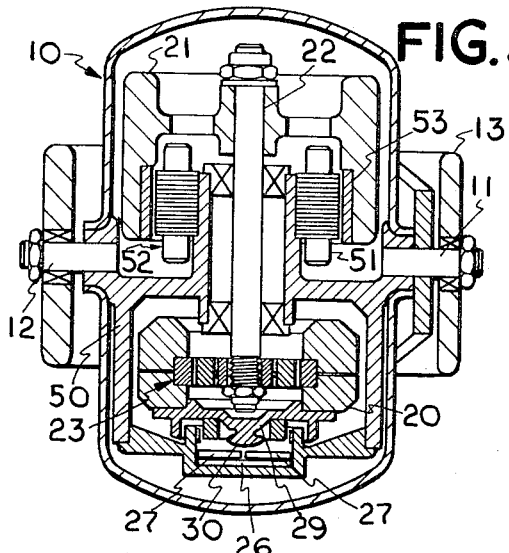
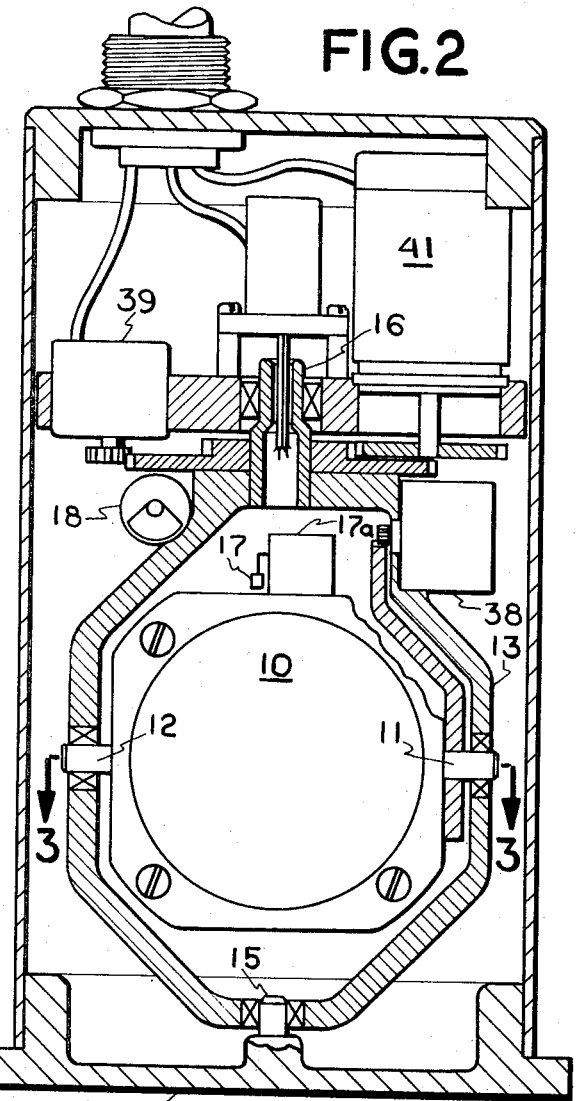
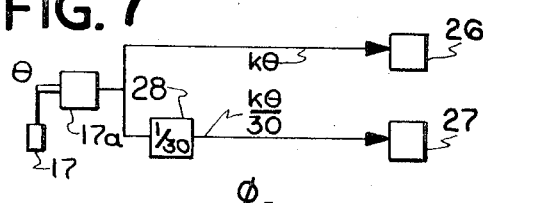
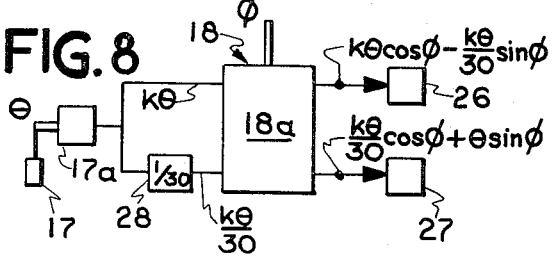
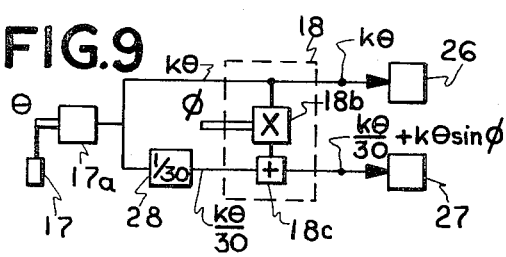
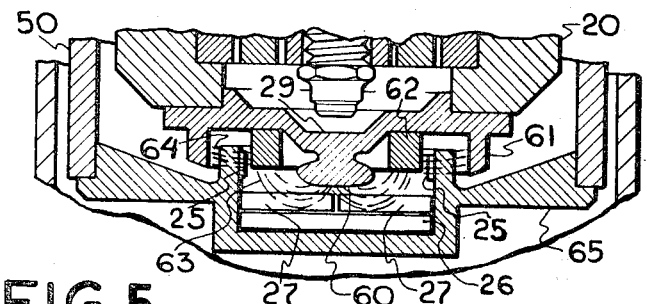

GYROCOMPASSES

The present invention relates to gyroscopes and has particular reference to gyrocompasses. A two-degree of freedom gyroscope is used as the displacement sensor and an inertia wheel is used as the primary stabilization element of the follow-up mechanism.

In general, precision gyrocompasses are rather complex devices. Several simplifications can be made by departing from existing practices without seriously degrading accuracy yet producing a low cost gyrocompass. This invention is such a gyrocompass.

In this invention a two-degree of freedom gyroscope and a separate spinning inertia wheel are supported on the innermost axis of a two-axis gimbal system, the spin aces of both the gyro and the inertia wheels being substantially coaxial, or at least parallel to each other. These elements are supported in an azimuth gimbal frame which is mounted for rotation about an axis perpendicular to the deck of the vehicle carrying the compass.

The innermost gimbal also carries a vertical sensor, the output of which is applied as a torque to the two degree of freedom reference gyro to cause it to precess into the meridian.

The azimuth frame, being perpendicular to the deck, tilts the torquing axes of the primary two-degree of freedom reference gyro wheel out of the true horizontal and vertical. Correction for this effect in the present design is obtained by resolving the torquing signals through a signal modifier sensitive to the cross tilt of the azimuth frame so that the axes of effective application of the torques are rotated out of the tilted axes and into the true horizontal and vertical. In prior gyrocompasses, the errors resulting from this effect were eliminated by utilizing an additional stabilization gimbal. The displacements of the reference gyro's spin axis from a reference axis in the housing, in planes normal and parallel to the deck, are sensed by pickoffs. The outputs of these pickoffs are applied to torquing motors on the gimbal support axis causing the inertia wheel to precess in the direction reducing the reference gyro pickoff outputs to zero. The inertia wheel thus replaces the usual follow up servo system. A primary advantage at this positional follow-up system is the resulting stability of the gimbal system with respect to base motion. A very low response torquing system is thus required to respond to the primary reference gyro in place of conventional high response positional control loops. The inertia wheel also maintains nominal pointing accuracy in the temporary absence of primary electrical power.

The heart of the gyrocompass is the reference gyro, and in the preferred embodiment the reference gyro is of the type having an all mechanical suspension such as that described in U.S. Pat. No. 3,301,073 and in U.S. Pat. Application Ser. No. 53,963 filed July 10, 1970 by me, now U.S. Pat. No. 3,702,568. The basic principle of this gyro is to support the rotor by an internal gimbal arrangement relative to a fixed drive shaft and spin motor. The gyro rotor is provided with its required angular freedom to act as a free displacement gyro, while spin rotation is accomplished through the gimbal suspension system. The spin motor drives the rotor at a particular speed known as the resonant speed at which the restraints of the gimbal arrangement on the rotor are completely eliminated, as described in the aforementioned patent.

This invention employs a novel simplified stabilization means. The spin motor, whose primary purpose is to drive the reference gyro wheel, also rotates a flywheel on the opposite end of the drive shaft at the same high speed as the reference gyro. Due to the gyroscopic inertia of the flywheel the spin axis is maintained stable under minor dynamic disturbances of the vehicle and satisfies the function of a high performance servo system in isolating the sensitive element from the base motions.

The tendency of the inertia wheel to drift (and thereby not maintain absolute stability) due to the effects of friction in the gimbal bearings, for example, are detected by the primary reference gyro. Pickoffs actuated by the reference gyro displacements energize torque motors effective on the inertia wheel. Thus, the torque motors cause the inertia wheel to process in the directions which reduce the pickoff outputs until the pickoff outputs are nulled. In effect, the torquers compensate for bearing friction and unbalance torques in the gimbal system so that very low torque and power are required, and the loop is required to respond only at a low rate. The control loop is a first order loop and is inherently stable without compensation circuits. Gear train backlash does does not affect the accuracy nor the stability of the loop. Taking all advantages into account, it will be seen that the result is a low cost simple reliable servo system.

A further feature of this gyrocompass is the simplified pickoff and torquing system which is provided for the primary two-degree-of-freedom reference gyro, and is particularly applicable to any non-floated, mechanically suspended, free-rotor gyro. The basic feature of this design is the use of a simple ring shaped magnet which is attached to the gyrorotor in a axial position. In combination with a soft iron backup plate and shaped pole elements, magnetic fields are established for both pickoff and torquing purposes.

The pickoffs consist of magnetic field sensors, such as Hall effect devices or magnetic sensitive resistors, which are introduced into a non-uniform region of the magnetic field, so that the field intensity at the sensors varies as a function of the gyro rotor angular displacement. In the preferred configuration a pair of sensors is utilized in an electrical bridge to provide high sensitivity and stability. Either AC OR DC excitation may be used. Torquing is accomplished by utilizing "FIG. 8" coils which are energized by DC current, with their resulting field interacting with a toroidal shaped magnetic field which is created on the gyro rotor by the magnetic ring and a central pole element.

The present gyrocompass is susceptible to all the error producing effects common to vertically damped gyro compasses as well documented in the literature. Similarly, the error producing effects can be compensated for or neglected, as fitting for the service to which the compass will be put, as disclosed in prior art.

It is an object of this invention to produce a miniature, low-cost, low power requirement gyrocompass.

It is a further object of this invention to isolate the gyro compass from high-rate base motions, by use of an inertia wheel and torquing system in place of conventional high performance servo systems.

It is another object of this invention to produce a gyro compass in which the need for a third gimbal axis is eliminated.

These and other objects will be made clear in the description to follow.

For a more complete understanding of the invention, reference may be had to the accompanying diagrams, in which:

FIG. 1 is a schemtic mechanical diagram showing the essential elements of one embodiment of the gyro compass of this invention.

FIG. 2 is a cross sectional view of the preferred embodiment of the gyro compass.

FIG. 3 is a cross sectional view of the sensitive element of the compass in FIG. 2, with the cutting plane along line 3—3 of FIG. 2.

FIG. 4 is a schematic wiring diagram of the pickoff and torquer arrangement.

FIG. 5 is an enlarged view of the pickoff and torquer construction.

FIG. 6 is a Vector diagram explaining the effect of cross tilt error.

FIG. 7 is an electrical wiring diagram in which cross-tilt error is present.

FIG. 8 is an electrical wiring diagram of one method for correcting for cross tilt error.

FIG. 9 is a modification of FIG. 8.

FIG. 10 is an overall wiring diagram between all elements, showing addition of corrective signals as required.

With reference now to FIGS. 1 and 2 of the drawings, a sensitive element 10 is supported by shafts 11, 12 in an azimuth frame 13, which is in turn supported from the deck or platform 14 by shafts 15, 16. Shafts 11, 12, nominally horizontal, are parallel to the deck 14 and shafts 15, 16 nominally vertical, are perpendicular to the deck 14.

The housing 19 of sensitive element 10 carries a vertical sensing device such as pendulum 17 and its associated pickoff 17a, which is oriented so as to sense tilts of the housing 19 out of the true horizontal about the axis of shafts 11, 12. Cross tilt signal modifier 18, (shown in FIG. 1 as a pendulous resolver although other devices can be used as will be described) which is sensitive to tilts of shafts 11, 12 out of the true horizontal in the plane of frame 13 is carried on either azimuth frame 13, as shown, or on housing 19. The signal modifier 18 transforms signals proportional to angular values about the horizontal and vertical axis to values about axis parallel and perpendicular to deck 14 as will be explained later.

The sensitive element 10 shown in section in FIG. 3, and schematically in FIG. 1, where the housing 19 is partially cut away to reveal the interior thereof, includes a reference gyro wheel 20 and an inertia flywheel 21 mounted on opposite ends of drive shaft 22. Interposed between gyro wheel 20 and shaft 22 is a universal joint 23, preferably of the type described in my copending U.S. Patent Application Ser. No. 53,963 (now U.S. Pat. No. 3,702,568) or in U.S. Pat. No. 3,301,073, issued Jan. 31, 1967.

Drive shaft 22 is journalled in a fixed frame 50 of the sensitive element 10. The frame 50 holds the stator 51 assembly of drive motor 52 (not shown in FIG. 1), the rotor assembly 53 of which is attached to flywheel 21. The universal coupling 23 is designed with appropriate spring restraints between its members about its pivot aixs, so that as motor 52 drives the shaft 22 at a speed known as the resonant speed, the reference gyro rotor 20 is completely uncoupled from the drive shaft, in accordance with the disclosures in the aforementioned U.S. patent.

Pickoff elements 24, 25 in FIG. 1, and torquing coils 26, 27 are fixed to the housing 19 of the sensitive element 10. The pickoff elements 24, 25 are preferably magneto resistive devices, whose resistances change according to the magnetic field they are exposed to. In FIG. 1, magnet 30 carried on a canopy 29 attached to the gyro wheel 20, is held in close proximity to the cross over point of the resistors 24, 25, when the gyro wheel's spin axis is aligned with the drive shaft 22. As the gyro wheel is displaced from this position, the magnetic field about resistors 24, 25 changes proportionately to unbalance their resistance values and produce a signal indicative of that displacement.

The magneto-resistors 24 and 25 may be connected in a pair of bridge circuits as shown in FIG. 4 for example, where a fixed resistor 31 is connected across resistor 24 and a fixed resistor 31a is connected across resistor 25. A source of fixed voltage E is connected across resistors 24 and 31 and across resistors 25 and 31a. As the magnet 30 is displaced unsymmatrically with respect to resistors 24 and 25, voltages proportional to these displacements are generated across center taps 32, 33 on resistors 24 and 31, i.e., terminals 36, and across center tops 33a, 35, 33a on resistors 25 and 31a, i.e., terminales 36a, respectively.

The torquer coils 26, 27 are the familiar figure eight coils, with coils 26 aligned perpendicular to the deck 14 and coils 27 aligned parallel to the deck 14. When the coils 26 are differentially energized, the magnetic field produced thereby reacts with the permanent magnet 30 to cause the gyro wheel 20 to precess in a plane parallel to the deck 14. Similarly when coils 27 are differentially energized, the resulting torque applied to the gyro wheel 20 causes it to precess in the plane perpendicular to the deck 14.

The preferred embodiment of the pickoff and torquer arrangement seen in FIG. 3, and shown enlarged in FIG. 5 in agreement with the principle of the schematic arrangement shown in FIG. 1 but includes novel construction which results in a superior pick off.

As seen particularly in FIG. 5 the outer surface of canopy 29 is provided with a central projecting core 60 and a coaxial ring 61. A ring magnet 62, axially magnetized, is secured to canopy 29, substantially midway between the core 60 and ring 61 setting up a magnetic flux field 63 between magnet 62 and core 60 and another magnetic field 64 between magnet 62 and ring 61.

A coil and resistor supporting structure 65, secured to frame 50, supports the torquing coils 26, 27 opposite the projecting core 60 and within the magnetic field 63, and supports the magneto-resistive elements 25 (similar elements 24 are not shown jin FIG. 4) on a ring 66 situated between the rings 60, 61 within the magnetic field 64.

When the gyro wheel 20 is aligned with its driving axis, the magnetic field strength at both elements 25 will be equal and no unbalance of resistance will be evident.

It will be seen that the field 64 is substantially perpendicular to the plane of element 25. If the element 25 is located within a region of uniform magnetic field there will be little or no change in the resistance of the element 25 as the magnet 62 moves closer to or further away from element 25 as the gyro wheel tilts from the driving axis. However, by placing the elements 25 near the fringes of the field 64, a tilt of the gyro wheel 20 in moving the magnet 62 closer to one element 25 results in a slight lateral movement of the magnetic field 64 across that element 25 thereby strengthening the field through the element 25. Similarly, as the magnet 62 moves away from the other element 25 the magnetic field though that element is weakened and an unbalance in the resistance of elements 25,25 occurs, thereby generating a proportional output signal, as shown in FIG. 4.

The permanent magnet ring 62 produces a radial magnetic field 63 near the coil pairs 26,26 and 27,27. Differential energization of either or both coil pairs with direct current produces a magnetic field which reacts with the magnetic field 63 thereby applying a torque to the gyro wheel of desired magnitude and direction to cause the desired precession of the gyroscope 20.

The housing 10 of the sensitive element is forced to follow the motions of the gyro 20, by the application of the output of pickoffs 24,25 to the torquing motors 38,39. Torque motor 38 carried on azimuth frame 13 applies a torque to the housing 10, about shafts 11,12 and therethrough to the inertial wheel 21, causing the inertia wheel 21 to precess in a plane parallel to the deck 14, thereby causing the housing to follow the motion of the gyro 20 in that plane. Torque motor 39 carried on the structural frame 40 applies a torque to the azimuth frame 13 about the azimuth axis through shafts 15,16 and therethrough to the inertia wheel 21 cuasing the sensitive element 10 to precess in a direction perpendicular to the deck 14, following the motion of the gyro wheel 20 in that direction.

The inertia wheel 21 therefor performs the function of follow up system and has certain advantages over the usual servo mechanism, e.g., it is highly efficient in resisting base motion disturbances without a high response servo, it can be torqued to maintain alignment with a precision reference gyro by a low power and low response torquing system, and small geared torquing motors may be used where backlash does not introduce positional errors.

Angle transmitter 41 carried by frame 40 transmits to a remote indicator (not shown) signals indicative of the heading angle, i.e., the angular displacement between azimuth gimbal frame 13 and the frame 40, which is the same as the angular displacement between the gyro spin axis and a reference azimuth on base 14.

The principle of operation follows classical gyro theory. When the gyro 20 is first placed in operation with the spin axis horizontal, the eastward the of the spin axis apparently rises from the horizontal plane. The motion of the spin axis with respect to the housing 10 is sensed by pickoffs 24,25 and the housing 10 follows the spin axis as just described, tilting with respect to the horizontal plane. The pendulum 17 detects the housing tilt and the output of pendulum pickoff 17a energizes the torquing coil 26 to cause the gyro 20 to precess toward the meridian. Torquing coil 27 is energized by a portion of the output of pendulum pickoff 17a through voltage divider 28, to cause to gyro to precess toward the horizontal plane, thus effecting vertical damping of the gyro 20.

It will be seen that due to the simplified gimballing, the torquing effects of coils 26,27 are not necessarily about horizontal and vertical axis as the platform 14 tilts out of the horizontal plane. Since the torques causing the gyro 20 to settle on the meridian are to be applied about the horizontal and vertical axis, the pendulous device 18 is utilized to correct the electrical torquing signals applied to torquing coils 26,27. The pendulous device 18 is mounted on the azimuth frame 13 or the housing 19, so as to be sensitive to tilts of the platform 14 in the plane of the azimuth frame 13.

With reference to FIG. 6, it will be seen that the torques T26 and T27 applied by the torquers 26 and 27 respectively can be combined into torques $T_H$ and $T_V$ about the horizontal and vertical axis as follows:

$$T_H = T_{26} \cos \phi + T_{27} \sin \phi \tag{1}$$

and $$T_V = T_{27} \cos \phi - T_{26} \sin \phi \tag{2}$$

where $\phi$ is the cross tilt angle, the angle by which the deck is tilted out of the horizontal about the north-south axis. For proper compass action, $T_H$ must be proportional to $\phi$, the tilt angle measured by the pendulum 17, and $T_V$ must be proportional to a small fraction, say one-thirtieth of $T_H$. If the torquers 26 and 27 are energized directly by the pickoff 17a by signals $k\theta$ and $k\theta/30$ as shown in FIG. 7 (neglecting for the moment the corrections for vehicle motions) the torques about the horizontal and vertical axis will contain a cross-tilt error since $T_H$ will not be proportional to $\theta$, nor will $T_V$ be equal to $T_H/30$. Cross tilt errors will be eliminated, however, if $$T_{26} \cos \phi + T_{27} \sin \phi = K\theta = T_H \tag{3}$$

$$T_{27} \cos \phi - T_{26} \sin \phi = (K\theta/30) = T_H \tag{4}$$

From 3 and 4 it can be determined that for $T_H$ to be equal to $k\theta$ and $T_V$ to be equal to $k\theta/30$, $T_{26}$ and $T_{27}$ must be:

$$T_{26} = K\theta \cos \phi - (K\theta/30) \sin \phi \tag{5}$$

$$T_{27} = K\theta \sin \phi + (K\theta/30) \cos \phi \tag{6}$$

Equations 5 and 6 indicate the manner in which the signal from pendulum pickoff 17a must be modified in the signal modifier 18 to correct for the cross tilt. The most precise correction would be obtained in a pendulous resolver 18a as shown in FIG. 8, energized by the $k\theta$ and $k\theta/30$ signals from pickoff 17a and voltage divider 28 and rotated through an angle $\phi$. The outputs of the pendulous resolver 18a, defined exactly by the Equations 5 and 6, energize the torquers 26 and 27. Examination of Equations 5 and 6 shows that some simplification of the modifier is possible as illustrated in FIG. 9. For example, in Equation 5 the $\sin\phi$ term is small compared to the $\cos\phi$ term and for all practical purposes can be neglected, while $\cos\phi$ is close to unity so that the torquer 26 can be energized directly by $k\theta$ from pickoff 17a. In Equation 6 this is not the case since the two terms are of comparable magnitude. A signal proportional to the $\theta\sin\phi$ can be obtained in a multiplier such as simple non linear transducer 18b with trigonometric characteristics having an electrical input of $k\theta$ from pickoff 17a and the transducer 18b may include a pendulous arm for mechanical movement of a rotor element with respect to a stater, or it may be an electrolytic device in which electrolytic fluid acts as a pendulum and is displaced with respect to fixed electrodes, for example. When this signal is added to the $k\theta/30$ signal from the voltage divider 28, at 18c and applied to torquer 27, the torque output of the torquer 27 can be expressed by Equation 6 since $\cos\phi$ is close to unity. It will be realized that the transducer 18b may have a linear characteristic instead of a trigonometric one within the limits of accuracy required since the $\sin\phi$ is nearly proportional to $\phi$ over the range of angles considered. In any case, the signal modifier 18 is called upon to insure that the signals to the torquers 26 and 27 are such that the torques applied by the torquers are equal to or nearly equal to those defined by Equations 5 and 6.

Thus, when the deck 14 is tilted and the orientation of frame 13 is such that the axis of shafts 11,12 are out of the horizontal plane, the output of pendulum pickoff 17a is modified by pendulous device 18 into components, which when energizing torquing coils 26,27 result in the desired torquing effects about the horizontal and vertical axis. When deck 14 is tilted, but the orientation of frame 13 is such that shafts 11,12 are horizontal, the pendulous device 18 is ineffective. The pendulous device 18 corrects for cross tilts, i.e., tilts of the platform 14 about the gyro spin axis.

When operating under conditions where the platform or deck 14 is subjected to high rate motions, the housing 10 is isolated from such motions, by the stabilizing influence of the inertia wheel 21. This eliminates the need for a third gimbal axis, which is generally employed to maintain the gyro spin axis horizontal, in the face of oscillating motions of the base.

There are many corrections and compensations required to account for motions of the earth and vehicle to make the compass relatively error free. Such compensations are well developed in prior gyro practice and their application to the present gyro-compass will be obvious to anyone skilled in the art. To complete the disclosure, however, these corrections and their application to the present invention, will be briefly discussed and with reference to the FIG. 10, the implementation of these corrections will be explained.

1. Spurious vertical and horizontal torques result in an azimuth offset. Due to vertical torques, the error is proportional to the tilt drift stability of the gyro and since the tilt drift stability of the present gyro, is in the order of a few tenths of a degree per hour, correction will not be needed. Due to horizontal torques, the spin axis settles with a tilt and the resulting earth's motion causes the axis, to settle off the meridian at a small angle, due to the vertical damping employed. Here again the error angle is small and correction is neglected in the present embodiment.

2. Velocity in the north-south direction is interpreted by the gyro as a tilt, the tilt rate being proportional to the velocity (North or South). A correcting voltage from proportional to Vn/R, where Vn is the velocity north and R is the radius of the earth, is applied to the torquing coils on the azimuth axis of the gyro, i.e., torquing coils 27 in such a direction as to cause the gyro spin axis to remain in the horizontal plane.

3. Acceleration in the north-south direction applies a force to the pendulum 17, producing an output signal, which, if applied to the torquing coils, would cause a heading error to develop. The effect can be minimized by choosing a torquing gradient due to the pendulum 17, which is small enough to make such errors small or negligible, but large enough to cause the compass to settle in a reasonable time period. In addition, however, a correcting signal, from transducer 44, may be added to the output of the pickoff 17a output during accelerations. Exact cancellation cannot be accomplished, as is well known, due to characteristics of a damped pendulum.

4. The proper operation of a gyrocompass requires that the gyro torquing axis be maintained in precise alignment, with the horizontal plane about a north-south axis. The objective is to eliminate adverse effects due to the vertical component of earth's rate. For example, a steady-state offset of 1 degree will result in a heading error of 1°, at 45° latitude. In addition, gyro damping will also change as a function of this offset. Usually this problem is solved by making the entire gyro pendulous about the north-south (gyro spin) axis by means of a separate gimbal. In the interest of simplicity and small size, the present design utilizes the signal modifier 18, sensitive to tilts of the frame 13 (which displace the torquing axis of coils 26,27 from the horizontal and vertical) to insure that the torquing signals are properly resolved as described in a foregoing portion of the specification.

5. Intercardinal Rolling Errors

Normal rolling produces tangential accelerations that act on the compass to cause the gyro torquing axis to be displaced from the horizontal, and simultaneously to cause the pendulum 17 to generate an output that produces an oscillatory azimuth precession. If both the output of the pendulum 17 and the deflection of the torquing axis are in phase, a rectified vertical torque can occur. To eliminate this possibility, the time constant of the pendulum 17 is selected to be significantly longer that the reciprocal of the natural frequency of the ships roll motion. The result is to produce a near 90° phase relationship between the azimuth precession and the displacement of the gyro torquing axis. The final effect of this error source is limited to a negligible value.

6. Gimballing Error

An additional source of error, which is common to all types of gyrocompasses, except fully stabilized 3 or 4 gimbal versions, results from the heading readout (outer azimuth gimbal axis) being mounted to the ship's deck. As a result, there is a geometric gimbal error compared to true vertical heading. This error is accepted in most cases in the interest of equipment simplicity.

7. Uncorrected vertical component of earth's rate creates an error proportional to the latitude of the operating area. This error is predictable and external correction of the heading information is accomplished by modifying the output of the angle transmitter 41 with the signal 42. In precision application a correction torque about the horizontal torquing axis of gyro 20 could be employed.

Although the invention has been described with reference to the particular embodiment it should be realized that the invention is susceptible to changes in form and detail within the scope of the appended claims.

I claim:

1. In a device of the character described, a supporting frame, a two degree of freedom gyroscope mounted in said frame, a gyroscopic inertia wheel mounted in said frame, the spin axis of said inertia wheel being fixed relative to said frame, the spin axis of said gyroscope and the spin axis of said inertia wheel being substantially parallel to each other.

2. The device as described in claim 1 including a base,
an azimuth gimbal frame mounted on said base and adapted for rotation thereon about a nominally vertical axis,
said supporting frame being mounted in said azimuth gimbal frame for rotation therein about a nominally horizontal axis,
said spin axis of said gyroscope and said inertia wheel being perpendicular to the axis of rotation of said supporting frame and being nominally horizontal.

3. The device as claimed in claim 2 including first torquing means on said azimuth gimbal frame for applying torques to said supporting frame,
second torquing means on said base for applying torques to said gimbal frame whereby energization of said first and second torquing means causes precession of said inertia wheel to thereby drive said supporting frame in the direction of said precession.

4. The device described in claim 3 including a shaft,
said gyroscope including a gyroscope wheel and a universal joint, said universal joint being interposed between one end of said shaft and said gyroscope wheel,
said inertia wheel being mounted on the opposite end of said shaft, and motor means for driving said shaft.

5. The device as decribed in claim 3 including pickoff means on said supporting frame for sensing the displacement of said gyroscope spin axis from a reference axis fixed to said supporting frame, means for energizing said first and second torquing means by the outputs of said pickoff means, whereby the supporting frame is caused to be driven so as to align said reference axis with said gyroscope spin axis, and to reduce the displacement there between to zero.

6. The device described in claim 5 including a shaft,
said gyroscope including a gyroscope wheel and a universal joint, said universal joint being interposed between one end of said shaft and said gyroscope wheel,
said inertia wheel being mounted on the opposite end of said shaft, and motor means for driving said shaft.

7. The device as described in claim 5 including a pendulum mounted on said supporting frame,
said pendulum detecting tilts of said reference axis out of the horizontal plane and producing an output signal indicative thereof,
third torquing means mounted on said supporting frame for applying a torque to said gyroscope about a nominally horizontal axis
fourth torquing means mounted on said supporting frame for applying a torque to said gyroscope about a nominally vertical axis,
said third and fourth torquing means being energized by said pendulum output signal, and
signal dividing means interposed between said pendulum and said fourth torquing means.

8. The device described in claim 7 including a shaft,
said gyroscope including a gyroscope wheel and a universal joint, said universal joint being interposed between one end of said shaft and said gyroscope wheel,
said inertia wheel being mounted on the opposite end of said shaft, and motor means for driving said shaft.

9. The device as claimed in claim 7, including means for detecting the tilt of said supporting frame about said reference axis
a signal modifier having an input proportional to said tilt,
said signal modifier being interposed between said pendulum output and said third and fourth torquing means whereby the cross tilt error producing effects of said third and fourth torquing means are nullified.

10. The device described in claim 9 including a shaft,
said gyroscope including a gyroscope wheel and a universal joint, said universal joint being interposed between one end of said shaft and said gyroscope wheel,
said inertia wheel being mounted on the opposite end of said shaft, and motor means for driving said shaft.

11. The device as claimed in claim 9 wherein the signal modifier is a trigonometric resolver.

12. The device as claimed in claim 9 wherein the signal modifier includes a multiplier having a trigonometric characteristic.

13. The device as claimed in claim 9 wherein the signal modifier includes a multiplier having a linear characteristic.

14. The device described in claim 13 including a shaft,
said gyroscope including a gyroscope wheel and a universal joint, said universal joint being interposed between one end of said shaft and said gyroscope wheel,
said inertia wheel being mounted on the opposite end of said shaft, and motor means for driving said shaft.

15. The device as claimed in claim 1 including a shaft,
said gyroscope including a gyroscope wheel and a universal joint, said universal joint being interposed between one end of said shaft and said gyroscope wheel,
said inertia wheel being mounted on the opposite end of said shaft, and motor means for driving said shaft.

16. A gyroscopic compass including a base, a two-degree-of-freedom gyroscope, a two gimbal system including an inner gimbal and an outer gimbal, said outer gimbal mounted on said base for rotation about an axis perpendicular to said base,
said inner gimbal mounted in said outer gimbal for rotation about an axis parallel to said base, said two-degree of freedom gyroscope mounted in said inner gimbal, angle detecting means, for detecting the angular displacement of said outer gimbal with respect to a reference axis in said base,
follow up means for aligning a reference axis in said inner gimbal with said gyroscope spin axis, pendulum means on said inner gimbal for detecting tilt of said reference axis out of the horizontal and producing an output signal indicative thereof, torquing means on said gyroscope for applying torques about said two axes of freedom of said gyroscope, said torquing means being energized by the signal output of said pendulum means, signal modifier means responsive to cross-tilts of said inner gimbal for modifying the signal output of said pendulum means to thereby eliminate cross tilt error producing effects in the two gimbal system, whereby the spin axis of said gyroscope is caused to settle on the meridian, and the angular displacement detected by said angle detecting means is the heading angle of said reference axis in said base.

* * * * *